United States Patent
Fairgrieve

[11] Patent Number: 5,925,461
[45] Date of Patent: *Jul. 20, 1999

[54] WATER BLOCKING COMPOSITES AND THEIR USE IN CABLE MANUFACTURE

[75] Inventor: Stuart Paterson Fairgrieve, Kidlington, United Kingdom

[73] Assignee: Neptco, Incorporated, Pawtucket, R.I.

[*] Notice: This patent issued on a continued prosecution application filed under 37 CFR 1.53(d), and is subject to the twenty year patent term provisions of 35 U.S.C. 154(a)(2).

[21] Appl. No.: 08/447,953
[22] Filed: May 23, 1995

[30] Foreign Application Priority Data

Jun. 2, 1994 [UA] Ukraine ................... 9411028

[51] Int. Cl.⁶ ....................................... D02G 3/00
[52] U.S. Cl. .......................... 428/372; 428/375; 428/378; 428/392; 428/394; 428/396
[58] Field of Search ...................... 428/372, 375, 428/378, 379, 396, 373, 392, 394

[56] References Cited

U.S. PATENT DOCUMENTS

| | | |
|---|---|---|
| 4,308,416 | 12/1981 | Herman et al. ............ 174/23 C |
| 4,779,953 | 10/1988 | Ohta et al. ............... 428/375 |
| 4,837,077 | 6/1989 | Anton et al. ............... 428/24 |
| 4,874,219 | 10/1989 | Arroyo et al. . |
| 4,888,238 | 12/1989 | Katz et al. ............... 428/378 |
| 4,909,592 | 3/1990 | Arroyo et al. . |
| 4,913,517 | 4/1990 | Arroyo et al. . |
| 4,966,809 | 10/1990 | Tanaka et al. ............ 428/377 |
| 5,050,957 | 9/1991 | Hamilton et al. . |
| 5,133,034 | 7/1992 | Arroyo et al. . |
| 5,155,304 | 10/1992 | Gossett et al. . |
| 5,249,248 | 9/1993 | Arroyo et al. . |
| 5,264,251 | 11/1993 | Geursen et al. . |
| 5,342,686 | 8/1994 | Geursen et al. . |
| 5,389,442 | 2/1995 | Arroyo et al. . |
| 5,481,635 | 1/1996 | Arroyo et al. . |
| 5,516,585 | 5/1996 | Young, Sr. et al. ......... 428/375 |
| 5,630,003 | 5/1997 | Arrayo . |
| 5,649,041 | 7/1997 | Clyburn, III et al. . |

FOREIGN PATENT DOCUMENTS

| | | |
|---|---|---|
| 0024631 | 3/1981 | European Pat. Off. . |
| 0141931 | 5/1985 | European Pat. Off. . |
| 0439277 | 7/1991 | European Pat. Off. . |
| 0482703 | 4/1992 | European Pat. Off. . |
| 3176332 | 7/1991 | Japan . |

Primary Examiner—William Krynski
Assistant Examiner—J. M. Gray
Attorney, Agent, or Firm—Mintz, Levin, Cohn, Ferris, Glovsky and Popeo, P.C.

[57] ABSTRACT

A water blocking composite for use in cables which includes an article selected from the group having one or more strengthening members and buffer tubes impregnated with or coated with a mixture of a thermoplastic resin and a water-swellable particulate material.

7 Claims, 1 Drawing Sheet

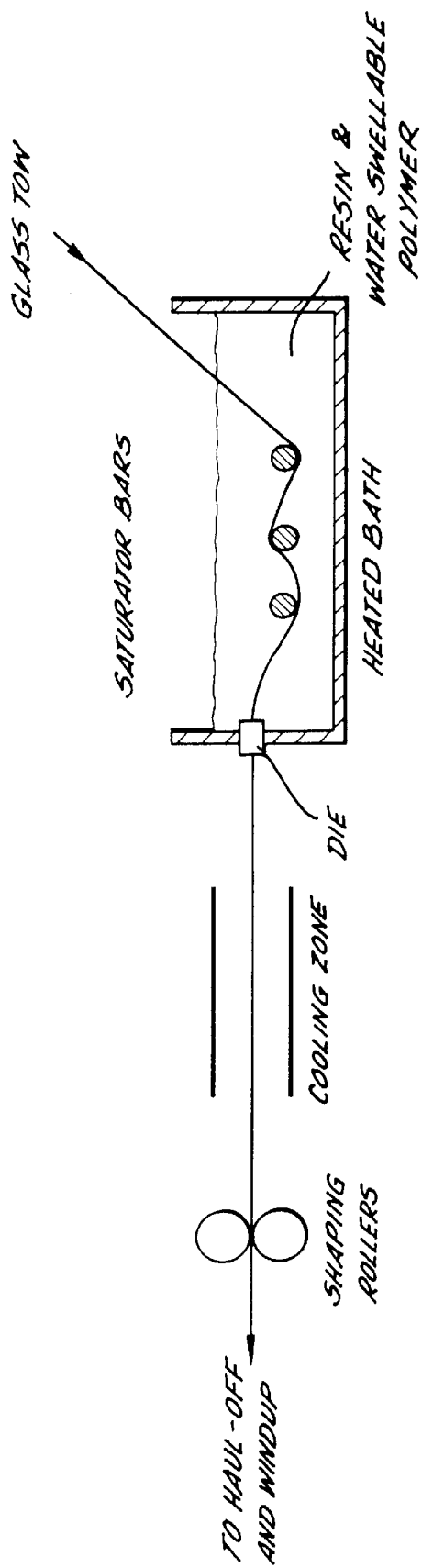

WATER BLOCKING COMPOSITES AND THEIR USE IN CABLE MANUFACTURE

BACKGROUND OF THE INVENTION

The present invention relates to water blocking composites and their use in cable manufacture and, in particular, their use in the manufacture of communications cables using fibre optics.

Cables, in particular communication cables using fibre optics, can quickly be damaged by water ingress, particularly if the water travels along the inside of the cable to splices, junctions, signal boosters etc. In the case of underwater or buried cables this problem can be quite serious. The ingress of water into the cable may be simply by the diffusion of water through the outer polymeric jacket, or by rupture of the outer jacket. Rupturing of the outer jacket may be caused by rodent or insect attack, by impact or by abrasion.

PRIOR ART

A number of methods exist for combatting this problem. The most widely used approach is to fill the inner regions of the cable with a thixotropic, hydrocarbon based, viscous fluid which is used as a filler compound in cables, such as that sold under the trademark RHEOGEL. This approach suffers from a number of disadvantages, including inefficiency of filling all of the voids within the cable, the process is messy and time consuming, and the adhesion of cable splices is difficult to achieve due to the gel interfering with welding operations or adhesives.

Superabsorbent polymers, e.g. partially crosslinked polymers which absorb many times their own weight in water, and swell considerably without dissolving, to form a gel have also been used. Such superabsorbent polymers have been provided in the form of wide sandwich tapes consisting of a layer of a superabsorbent polymer powder sandwiched between two layers of a non-woven fabric. Tapes of this type have been described, for example, in U.S. Pat. No. 4837077 and EP-A-0024631. However, these products are expensive and cause considerable unwanted increases in cable diameters due to their thickness.

Fibrous substrates with superabsorbent polymer incorporated therein, such as aramid substrates, have also been used, particularly as strengthening wraps for the inner portions of cables. Substrates of this type have been described in EP-A-0482703. However, the methods used to deposit the superabsorbent onto the fibres are not particularly effective and do not result in a high level of superabsorbent on the fibrous substrate. Furthermore, the fibres are not effectively bound together which leads to potential problems of loose fibres during cable assembly processes. Some methods of applying the superabsorbent to the fibres involve the use of organic solvents, with consequential environmental concerns.

We have now developed a water blocking composite for use in cables, and a method for the preparation thereof, which overcomes the disadvantages discussed above.

SUMMARY OF THE INVENTION

Accordingly, the present invention provides a water blocking composite for use in cables which comprises a strengthening member or buffer tube impregnated with or coated with a mixture of a thermoplastic resin and a water-swellable particulate material.

BRIEF DESCRIPTION OF THE DRAWING

FIG. 1 illustrates diagrammatically one method of preparing the water blocking composites of the invention.

DETAILED DESCRIPTION OF THE INVENTION

A strengthening member in a cable is a component with a substantially higher modulus than the plastic elements of the cable construction. Its purpose is to limit the elongation or compression of the cable when the cable is subjected to thermal or mechanical loads.

The water blocking composite may comprise a strengthening member which is a central strengthening member, an upjacketed central strengthening member, or intermediate strengthening member or spacer, or an outer strengthening wrap.

It will be understood that an upjacketed central strengthening member comprises a rod-like composite which is coated with a polymeric jacket in order to achieve good packing with the other components of the cable.

The strengthening member may comprise a fibrous substrate which is impregnated in accordance with the present invention. The fibrous substrate is preferably glass fibre, but may alternatively comprise a man-made fibre such as aramid, particularly those sold under the Trade Names TWARON and KEVLAR. The fibrous substrate is preferably in continuous form and may comprise glass fibre filaments, glass fibre tow bundles, glass fibre rope or glass fibre rod.

Buffer tubes which may be coated in accordance with the invention contain the fibre optic cables or other communication media.

The thermoplastic resin which is used to impregnate or coat the strengthening member or buffer tube may be any thermoplastic polymer, or mixture of polymers, preferably a low melting point polymer or polymer mixture such as a low-melt adhesive composition.

The water-swellable particulate material which is used in the present invention is preferably a superabsorbent polymer such as an acrylate, urethane or cellulosic based superabsorbent material, preferably a partially crosslinked acrylate polymer.

The water blocking composite of the present invention may be prepared in various forms, for example as a ribbon, tape or rod, depending upon the intended use thereof. It will be appreciated that a range of differently shaped ribbons, tapes or rods may be provided, depending on the particular application. Furthermore, the thickness of the water blocking composite can be readily controlled which prevents an undue increase in the cable dimensions. In one aspect of the present invention, the water blocking composite acts as a strengthening member for a cable. It may be in the form of a rod and be incorporated into the cable as a central strengthening member, or an upjacketed central strengthening member, or it may be in the form of a tape or ribbon and be incorporated into the cable as an outer strengthening wrap. Although the water blocking composite may act as a strengthening member it also performs its primary function of water blocking.

The present invention also includes within its scope a method for the preparation of a water blocking composite for use in cables, which method comprises impregnating or coating a strengthening member or buffer tube with a molten thermoplastic resin having a water-swellable particulate material dispersed therein, and cooling the impregnated fibrous substrate to solidify the thermoplastic resin. It will be understood that a plurality of strengthening members or buffer tubes impregnated or coated with the thermoplastic resin/water-swellable particulate material mixture may be incorporated into a single cable, if desired.

The method of the present invention enables a wide range of strengthening members or buffer tubes to be impregnated or coated with the thermoplastic resin/water-swellable particulate material mixture. It is believed that the process of impregnating or coating the strengthening member or buffer tube with the thermoplastic resin/water-swellable particulate material mixture causes the powder to accumulate at the surface of the composite, thus exposing the major proportion of the water-swellable particulate material to any incoming water, thus allowing the maximum effective use of the water-swellable particulate material in the water blocking composites. The method of the present invention provides a water blocking composite in which the water-swellable particulate material is adhered to the composite to prevent problems of powder flaking and also provides a composite which is coherent as a whole to prevent the appearance of loose fibres.

In carrying out the method of the present invention the thermoplastic resin preferably contains from 10 to 200 parts by weight, more preferably from 20 to 50 parts by weight, of the water-swellable particulate material per 100 parts by weight of the resin.

The mixture of the water-swellable particulate material and the molten thermoplastic resin may be contained in a bath through which the strengthening member or buffer tube may be passed continuously, for example in the form of glass fibre filaments, glass fibre tow bundles, glass fibre rope or glass fibre rod. The level at which the mixture is impregnated into or coated onto the strengthening member or buffer tube may be controlled by the length of time that the substrate is immersed in the bath, the incorporation of dies, rollers or doctor blades through or past which the fibrous substrate passes, or by any other suitable means. The shape and thickness of the composite may also be controlled at the impregnation/coating stage by the rollers or die, or by the use of a second set of rollers having a controllable nip size through which the composite passes.

An advantage of the method of the present invention is that no curing or drying stage is required during manufacture since the thermoplastic resin only requires to be cooled to a solid form. This can be achieved by air cooling or enforced cooling, if desired.

The present invention will be further described with reference to the single Figure of the accompanying drawings which diagrammatically illustrates one method of carrying out the invention.

A glass tow 1 is passed into a bath 2 containing a mixture of a molten resin and a superabsorbent polymer powder. The glass tow is passed beneath a first saturator bar 3, over a second saturator bar 4 and under a third saturator bar 5 in order to ensure that the tow is thoroughly impregnated with the resin/water-swellable polymer mixture. The glass tow exits from the bath through a die 6 and enters a cooling zone 7 which may, if desired, have cool air blown therethrough. On exiting from the cooling zone the impregnated glass tow then passes through a pair of shaping rollers 8 which control the thickness of the impregnated glass tow emerging therefrom. The resultant composite 9 is then passed to a haul-off and wind-up unit to give a final product package.

The present invention will be further described with reference to the following Examples.

EXAMPLE 1

A single glass tow bundle was passed through a molten mixture of an ethylene vinylacetate based hot-melt adhesive, such as that produced by National Starch under the trademark INSTANTLOK, containing 30 parts by weight per 100 parts by weight of the adhesive of a superabsorbent polymer powder, such as that produced by Chemdal Ltd under the trademark ARIDALL 1820F, in a heated bath at a temperature of from 150° to 160° C. with a 0.035" diameter circular die installed in the front face. The resin/water swellable polymer mixture was impregnated into the tow by passage over three saturator bars immersed in the molten mixture. The loading of the mixture onto the glass tow bundle was controlled by the die. The hot impregnated tow was passed through an air cooling unit, and into the nip of a pair of steel shaping rollers set 0.5 mm apart. The resultant composite was then passed to a haul-off unit and wound onto a cardboard care to give the final product package. The product composite was 0.6 mm thick and 1.5 mm wide.

EXAMPLE 2

Using the method of Example 1, but with the nip of the shaping rollers set at 0.4 mm, a composite of 0.5 mm thickness and 1.7 mm width was produced.

EXAMPLE 3

Using the method of Example 2, but using a TWARON fibre tow in place of glass, an aramid based composite of 0.5 mm thickness and 1.5 mm width was produced.

EXAMPLE 4

A resin blend was made up from a 1:1:1 mixture of ethylene-vinylacetate (Grade 18/150–300; Elf Atochem), hydrocarbon resin such as that produced by Hercules inc. under the trademark KRISTALLEX 3115, and microcrystalline wax such as that produced by Astor Stag Ltd under the trademark OKERIN 319 and 30 parts per hundred parts of the blend of ARIDALL 1820F mixed therewith. This mixture was heated in a bath at 110 to 120° C. and coated onto a glass tow to produce a composite of 0.5 mm thickness and 1.7 mm width.

EXAMPLE 5

A 2 mm diameter epoxy/glass rod, designed as a central strengthening member for a fibre optic cable, was coated with a mixture of a hot melt adhesive (INSTANTLOK 34.2661) containing 30 parts by weight per 100 parts by weight of the adhesive of a superabsorbent polymer (ARIDALL 1820F), through a die, to produce a composite with a 100 micrometer thick outer water absorbing layer.

EXAMPLE 6

A 2 mm diameter epoxy/glass rod, similar to that used in Example 5, and extrusion coated with a 2 mm thick jacket of linear low density polyethylene, was coated on the outer polymeric surface with the mixture of hot melt adhesive and superabsorbent polymer as described in Example 5, through a suitable die, to produce a composite with a 50 micrometer thick outer water absorbing coating.

EXAMPLE 7

Two tows of glass were passed into the bath system as described in Example 1 through separate dies and out of the bath through a single die as a composite ribbon. The other processing conditions were as described in Example 1.

EXAMPLE 8

A 2 mm diameter buffer tube, i.e. a polybutylene terephthalate tube containing optic fibres and hydrophobic gel, was coated with the mixture and by the method of Example 5, resulting in a 100 micrometer thick water absorbing coating.

TESTING

The cable industry tests blocking systems by incorporating the product into a cable assembly and subjecting a 1 m sample (open at both ends) to a head of water at one end. The current test is to use a 1 m head of water, and test the cable for 24 hours. If no water appears at the open end of the sample within this time, the sample is deemed to have passed. It has recently been noted that the industry is considering changing this test to a 3 m head of water consequently this, more rigorous, test was used to evaluate the above product.

As an initial assessment, a simulated cable was prepared by constraining a bundle of 80 strands of the product of Example 1 in a 1 cm (final diameter) heat shrinkable tube, and exposing a 1 m length of this tube to a 3 m head of water. After 24 hours no water was observed at the open end of the sample. Using transparent tubing, and coloured water, allowed the progress of the water front along the sample to be followed. The maximum travel after 24 hours was noted at 30 cm; leaving the sample on the rig for a further 3 days showed that no further movement of water along the sample occured.

The composites of Examples 2, 3 and 4 also passed the above test.

The material of Example 2 was made into a simulated cable in the following manner—17 strands of the composite were wrapped around a 1 cm diameter polyethylene rod of 1 m length, with a pitch of three turns per meter. This assembly was constrained in a heat shrinkable tube, and tested in a similar manner to the previous samples. This simulation also passed the 3 m head of water.

A water blocking rod of Example 5 was incorporated into a simulated cable in the following manner—six buffer tubes (as defined in Example 8) of the same diameter as the rod were helically disposed equally around the rod with a pitch of three turns per meter. The external spaces between the buffer tubes were filled with an inert hot-melt adhesive, using a commercial hot-melt gun, taking care to avoid leakage of the adhesive into the inner space between the rod and the buffer tubes. The assembly was then jacketed with heat-shrinkable, transparent, tubing and subjected to the 3 m head of water test. No flow of water through the sample was noted after the required 24 hr period.

What is claim is:

1. A water blocking composite for cables which comprises one or more strengthening members or buffer tubes impregnated with or coated with a formulation consisting of a hot melt adhesive having dispersed therein from 20 to 50 parts by weight of a water-swellable particulate material to 100 parts by weight of said hot melt adhesive.

2. A composite as claimed in claim 1 wherein the strengthening member is a central strengthening member, an intermediate strengthening member, a spacer, or an outer strengthening wrap.

3. A composite as claimed in claim 2 wherein the strengthening member is fabricated from a fibrous material comprising one of glass fiber and aramid fiber.

4. A composite as claimed in claim 1 wherein the hot melt adhesive is an ethylene vinylacetate based hot melt adhesive.

5. A composite as claimed in claim 1 wherein the water swellable particulate material comprises a superabsorbent polymer.

6. A composite as claimed in claim 5 wherein the superabsorbent polymer is a partially cross-linked acrylate polymer.

7. A composite as claimed in claim 1 wherein the formulation consists of 30 parts by weight of water-swellable particulate material to 100 parts by weight of an ethylene vinylacetate based hot melt adhesive.

* * * * *